United States Patent [19]

Floden

[11] 3,905,691

[45] Sept. 16, 1975

[54] FILM PROJECTOR APPARATUS
[75] Inventor: Bjorn Fritjof Floden, Palmyra, N.J.
[73] Assignee: RCA Corporation, New York, N.Y.
[22] Filed: Feb. 14, 1974
[21] Appl. No.: 442,428

[52] U.S. Cl. .................................. 352/29; 352/26
[51] Int. Cl.² ........................................ G03B 31/02
[58] Field of Search ................. 352/25, 26, 27, 29; 360/71, 90

[56] References Cited
UNITED STATES PATENTS
3,166,755   1/1965   Eisinger et al. ...................... 352/27
FOREIGN PATENTS OR APPLICATIONS
413   9/1905   United Kingdom ................. 352/25
403,481   6/1966   Switzerland ......................... 352/29

*Primary Examiner*—Fred L. Braun
*Attorney, Agent, or Firm*—Eugene M. Whitacre; Mason DeCamillis

[57] ABSTRACT

A film projector apparatus is provided in which it is possible to attain instantaneous transducing of sound or other signals with an information track of the film without distortion. This is accomplished by provision of an auxiliary drive arrangement which is selectively enabled to quickly accelerate the projector sound drum to near normal operating speed. In addition, upon stopping of the film feed through the projector, an arrangement is provided to maintain a desired portion of the film in the area of the transducer in a taut condition.

8 Claims, 4 Drawing Figures

PATENTED SEP 16 1975 3,905,691

FILM PROJECTOR APPARATUS

This invention relates to sound transducing in a movie film projector system. More particularly, the invention concerns an arrangement for providing instant quality sound transducing capability where the system is subjected to start and stop conditions.

In existing systems of this type a relatively long period is required to bring the film from a stalled condition up to its normal operating speed at which sound transducing can be accomplished without distortion. An attempt to accomplish sound transducing before the film has reached its normal operating speed causes distortion in the transducing process. Delaying such transducing until the film assumes its normal speed may result in loss of film material and undersirable delays in sound transducing. Such undesirable effects are particularly a problem when it is desired to transduce sound information with a particular portion of a film. This is particularly true where the apparatus is utilized in an environment such as a broadcast studio, where the sytem is subjected to frequent start and stop conditions. Thus, it is desirable to commence distortionless sound transducing at exactly the beginning of desired portion of the film.

Typically in sound projector systems the film is drawn about a rotatable sound drum by a drive means such as a sprocket which cooperates with the film. The movement of the film by the sprocket causes rotation of the sound drum, providing stabilized velocity of the film for transducing by a stationary transducer located to cooperate with the film passing over the sound drum. Thus, for faithful transducing of sound with the film, the sound drum and film must be brought to their normal operating speed from a stopped condition as quickly as possible. In addition, it is important to provide for immediate advancing of the film over the sound drum by the film advancing sprocket drive. Thus, slack portions or loops in the film must be avoided between the film advancing sprocket and the sound drum. Otherwise, the initial rotating of the film advancing sprocket will be occupied with removing the slack or looped portion of the film, thus delaying moving of subsequent portions of the film over the sound drum.

In accordance with the features of the invention, slack portions of the film between the sound drum and the film advancing sprocket are prevented upon stopping of the projector apparatus. In addition, the sound drum is brought to its normal operating speed from a stalled condition in a minimal amount of time. Thus, it is possible to provide instant distortionless sound transducing which commences at exactly the beginning of a desired film passage.

The present invention will best be understood by referring to the following description thereof and the accompanying figures, in which.

Figure 1:
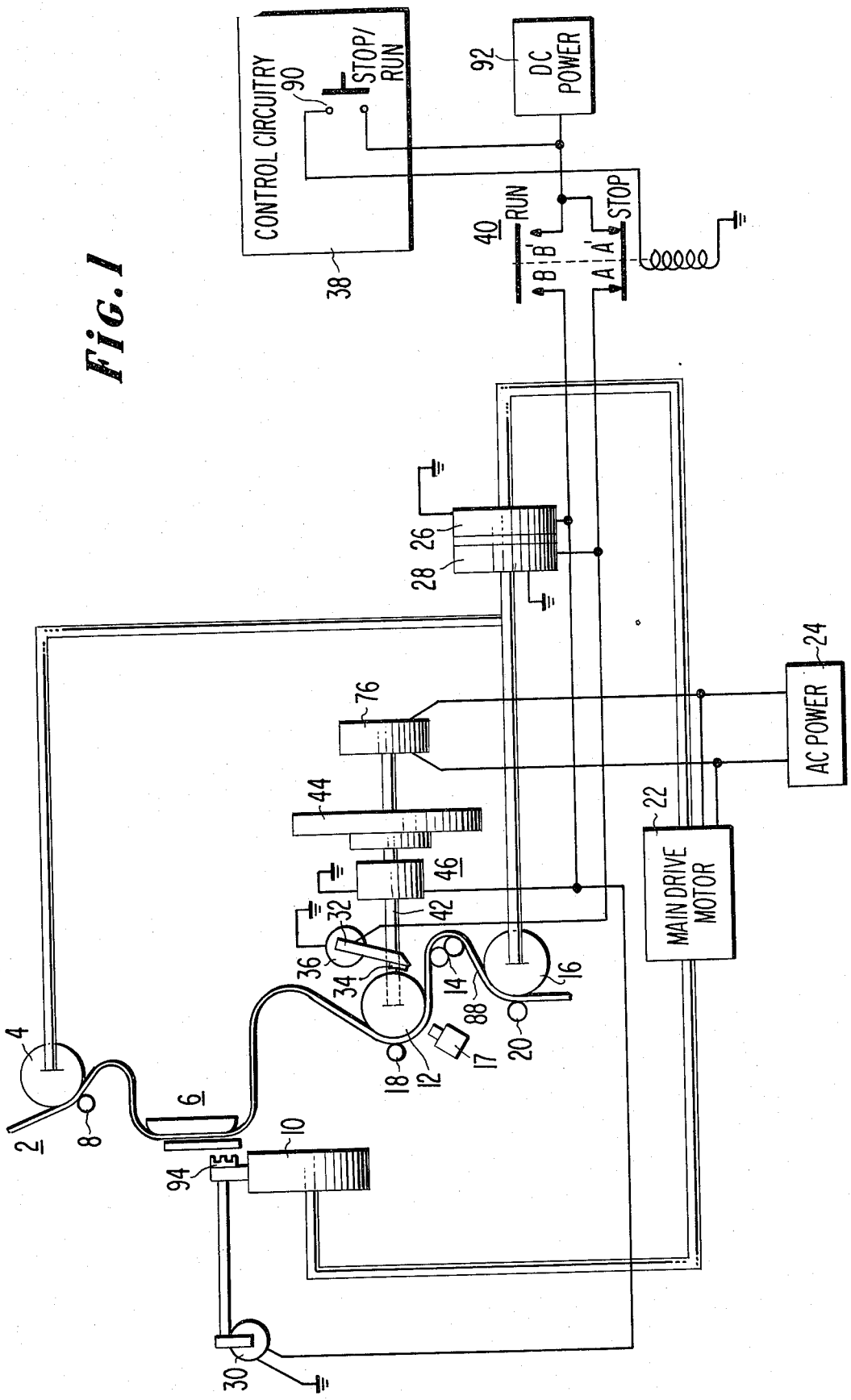
FIG. 1 is a film projector apparatus in diagrammatic form which embodies the invention.

In FIG. 1 the film 2 is passed about a film advance device such as a sprocket 4 toward a film gate 6. The film 2 is maintained in cooperative relation with the sprocket 4 by means of a guide member 8. Associated with the film gate 6 is a well-known intermittent mechanism 10 which is operative cyclically to advance the film through the film gate 6. From the film gate 6 the film passes about a known type of non-sprocketed rotatably mounted sound drum 12. The film is advanced over the sound drum 12 and a pair of further guide members 14 by a film advance sprocket 16. A known type of magnetic or optical sound transducing means 17 is located adjacent the sound drum for cooperation with the film portion disposed over the sound drum. The guide members 18 and 20 are utilized to maintain cooperation of the film with the sound drum 12 and drive sprocket 16, respectively. Advancement of the film by the drive sprocket 16 causes the sound drum 12 to be rotated at a velocity in accordance with the film speed.

Movement of the film advance sprockets 4 and 16, as well as the intermittent 10, is provided by a main drive motor 22. The main drive motor, for example, may be an AC motor such as a synchronous motor which is powered from the energy source 24. The sprockets 4 and 16 are coupled to the main drive motor 22 through a known type of clutch member 26 which is selectively operable as hereinafter discussed for disabling the film advance sprockets 4, 16. Preferably, a brake member 28 is also included in the sprocket drive arrangement for arresting movement of the sprockets upon decoupling from the main motor drive 22. A solenoid 30, which may be (as shown) of well-known rotary type, is mechanically coupled to the intermittent 10. The solenoid 30 is utilized to selectively interrupt the cooperation of the intermittent 10 with the film 2 when it is desired to inhibit passage of the film through the film gate 6.

Associated with the rotatable sound drum 12 is a brake assembly consisting of a force arm 32 and a brake shoe 34 which may be brought into frictional contact with the sound drum 12 for arresting motion of the drum. The force arm 32 is coupled to an actuating member 36, which may, as shown, comprise a well-known type of rotary solenoid which is selectively operable to apply a braking force to the sound drum 12. Operation of the solenoid brake assembly is in accordance with control circuitry 38 acting through a portion of a switching device such as the relay 40.

Fixedly attached to the sound drum for rotation therewith is a shaft 42. The shaft 42 is selectively mechanically coupled to a flywheel 44 by means of an intermediate clutch 46. Selective engagement between the flywheel 44 and the shaft 42 secured to the sound drum 12 is effectuated from control circuitry 38 through a further switching portion of the relay 40.

Figure 2:
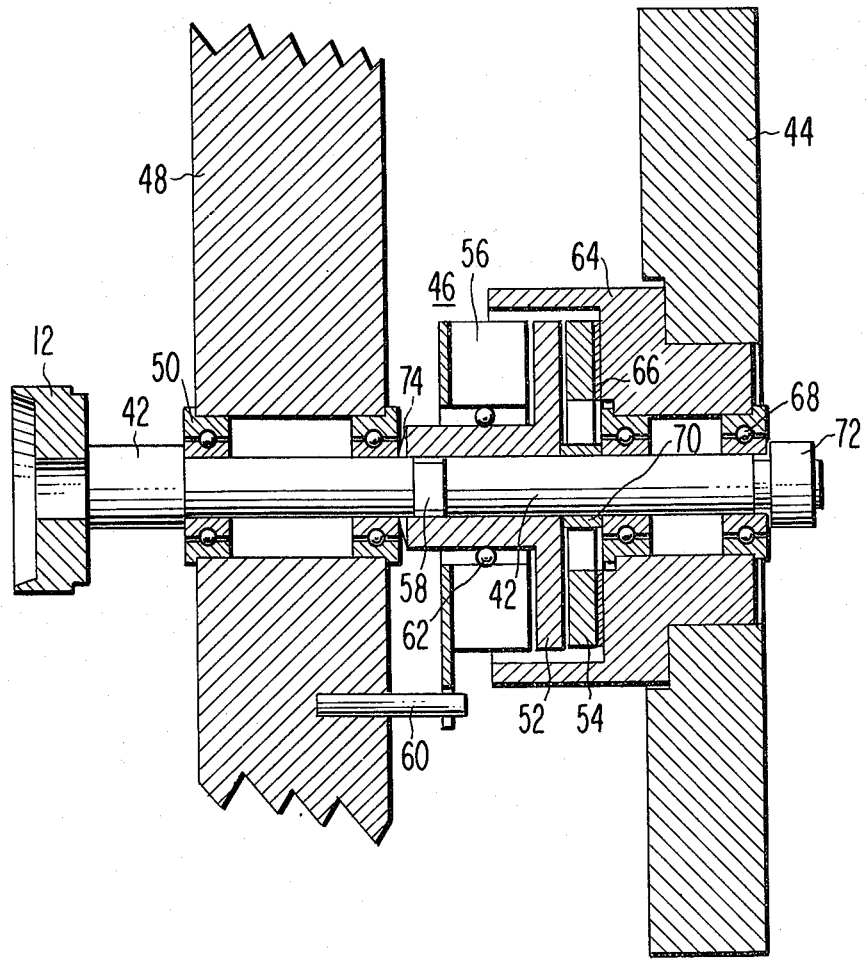
FIG. 2 is a side view partially in section illustrating mechanisms associated with the sound drum portion of the arrangement of FIG. 1.

Details of the coupling between the flywheel 44 and sound drum shaft 42 are shown in FIG. 2. The shaft 42 is mounted for rotation with respect to a fixed frame member 48 of the projector by means of roller bearing members 50. Disposed on the central portion of the shaft 42 is the clutch assembly 46. The clutch assembly 46 includes two rotatable portions 52, 54 and a stationary portion 56. The first rotatable portion 52 is secured to the shaft 42 for rotation therewith but by suitable means such as a set screw cooperating with a flatted shaft portion 58. The stationary portion 56 which contains a winding for actuating the clutch is inhibited from rotation by a coupling pin 60 to the fixed frame 48. A bearing 61 is provided between the fixed clutch portion 56 and the first rotatable portion 52. The further rotatable clutch portion 54 upon energizing of the winding on the fixed portion 56 causes engagement and therefore mechanical coupling and coincident rotation of the two rotatable portions 52 and 54. The further rotatable portion 54 is coupled to a hub 64 secured to the flywheel 44 by means of a resilient member 66 such as an annularly shaped leaf spring. The flywheel 44 and its hub 64 are mounted for rotation with respect to shaft 42 by means of bearing assembly 68. Bearing assembly 68 is maintained in spaced relation with the first movable clutch portion 52 by means of a spacer 70. The resilient coupling 66 between the movable clutch portion 54 and the hub 64 allows lateral movement of the member 54 for clutch engagement, without the necessity of corresponding lateral movement of the flywheel 44. The resilient member 66 also serves to insure disengagement of the respective rotating portions 52 and 54 upon de-energizing of the clutch assembly 46. A retaining collar 72 at the free end of the shaft 42 and a spring member 74 are utilized to maintain proper positioning of the various mechanical elements along the shaft 42. Thus, for the condition shown for the arrangement shown in FIG. 2 with the clutch assembly 46 de-energized, the sound drum 12 and flywheel 44 are mechanically independent, whereas upon energizing of the clutch assembly 46, the flywheel and drum are rotationally interdependent.

As shown in FIG. 1, a further drive motor 76 is provided in conjunction with the sound drum assembly. The further drive motor 76, which is preferably a synchronous AC motor rotatable at a substantially constant velocity, is continuously energized from power source 24. In operation, the motor 76 is arranged to drive the flywheel 44 at a velocity which is close to but slightly less than, for example, 99% of the normal 100% operating speed of the sound drum 12 as provided by advancement of the film 2 over the sound drum 12 by the drive sprocket 16. The motor 76 includes a drive hub 78 secured thereto which is coupled with the hub portion 64 of the flywheel 44 discussed with respect to FIG. 2.

Figure 3A:
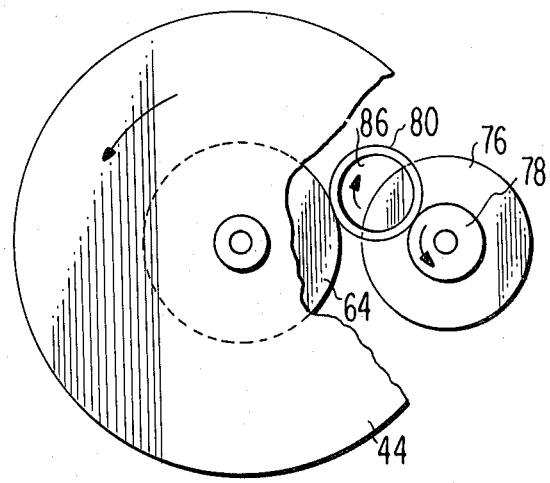
FIGS. 3a and 3b are side and top views of details of a drive arrangement associated with the flywheel portion of FIGS. 1 and 2.

FIGS. 3a and b show a preferable arrangement for intercoupling rotational motion between the hubs of the flywheel 44 and drive motor 76 to permit a variation in the driven speed of the flywheel member 44. As shown particularly in FIG. 3a, the rotation axes of the flywheel 44 and drive motor 76 are arranged in horizontal parallel spaced relation. A hollow cylindrically shaped idling member 80 acts in a downward direction to nestle between the hub 64 of the flywheel and drive motor hub 78.

Figure 3B:
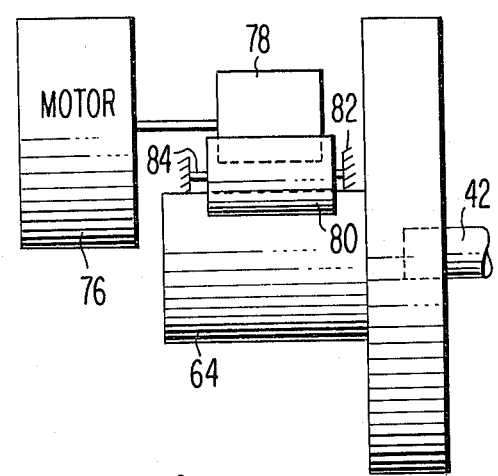

As shown in FIG. 3b, lateral movement of the idling member 80 parallel to the axis of the flywheel 44 and motor 76 is restricted. This is accomplished by a pair of plate-like members 82 secured to opposite ends of a shaft 84 which passes through the central opening 86 of the idling member 80. It will be noted that the diameter of the shaft 84 is substantially smaller than the central opening 86 of the idling member, thereby allowing the idling member 80 to find its rotational axis independent of the shaft 84.

In operation of the system, it will be noted that the main drive motor 22 which is utilized to provide drive to the film advance sprockets 4, 16 and movement to intermittent 10 is permanently coupled to the power source 24 and therefore is maintained at all times at driving speed. Assume for purposes of the present explanation that the film 2 has been correctly threaded through the projector film path, as shown in FIG. 1, including a taut portion 88 extending between the sound drum 12 and the drive sprocket 16 and that the system is disposed in a stopped condition, as indicated by the non-depressed condition of the stop/run push button switch 90. For this condition, as is shown in FIG. 1, the relay 40 is in its unenergized state with the contacts A, A' being closed, while contacts B, B' are disposed in an open condition. For this condition DC power from the source 92 is passed through the contacts A, A' of relay 40 causing the brake solenoid 36 to be energized holding the brake shoe 34 in contacting relation with the sound drum 12 and with the sprocket brake 28 in the energized condition. It will be noted that at this time the clutches 46 and 26 are de-energized, thereby decoupling the main drive motor 22 from the sprocket drives 4, 16 as well as decoupling the flywheel 44 from the sound drum shaft 42. In addition, for this condition the solenoid 30 associated with the intermittent 10 is disposed in a condition to prevent engagement of the intermittent claw 94 with the film passing through the film gate 6. At this time, although the flywheel 44 is decoupled from the sound drum shaft 42, the flywheel is coupled to the motor 76 which is continuously energized for rotation by the AC power source 24. Rotation of the flywheel 44 from the motor 76 is accomplished as discussed with respect to FIGS. 3a and 3b through the frictional engagement of the periphery of the idling member 80 and the hub portions of the motor 76 and flywheel 44. As previously indicated, the motor 76 is arranged to rotate at a substantially constant speed which is related to a flywheel velocity that is, say, approximately 1% slower than the normal operation velocity of the sound drum 12 as rotated by drawing film thereover. Thus, the flywheel 44 during the stopped condition of the projector apparatus is rotated by motor 76 at a speed slightly less than the normal operating speed of the sound drum.

When it is desired to operate the projector including transducing of sound from the film 2, the stop/run switch 90 is disposed in its depressed or closed position. This provides DC power to the relay 40 causing contacts A, A' to open and contacts B, B' to close. This condition of the relay 40 causes the sprocket clutch 26 to engage the main drive motor 22 and release the sprocket brake 28. The intermittent solenoid 30 is also energized, permitting engagement of the intermittent claw 94 with the film 2. Thus, the system is conditioned for advancing film through the projector. At the same time, the brake solenoid 36 is de-energized, freeing the sound drum 12, and the clutch 46 is energized to couple the flywheel 44 with the sound drum shaft 42. Now since the flywheel 44 is rotating at a speed near the normal operating speed of the sound drum 12, the sound drum is accelerated toward its normal speed in rapid fashion under the influence of the flywheel 44. As the film 2 is advanced over the sound drum 12 by the sprocket 16, the sound drum is driven by the film at its 100% normal operating speed. The flywheel 44, which is coupled to the sound drum shaft 42, is in response driven at the speed of the sound drum 12. The flywheel 44, however, remains coupled to the motor 76 through the idling member 80, whose operation accounts for the speed differential between the motor 76 and the now sound drum-driven flywheel 44. That is, when the flywheel 44 is driven by the motor 76, the idling member 80 tends to wedge between the respective hubs 64, 78 of the flywheel and driving motor, thus rotating the flywheel at a velocity related to the rotational speed of the motor 76. When the flywheel 44 is driven by the sound drum 12, as a result of film movement, at the higher normal operating speed of the sound drum the idling member 80 is free to be lifted slightly by the frictional force on its periphery to allow overrun. In addition, any tendency of the flywheel 44 to speed above the 100% normal operating speed will be counteracted by friction with the idling member 80; and any tendency of the flywheel 44 to slow down below the 99% speed will be counteracted by the idler 80 as its speed is controlled by the constant speed of the hub 78 driven by the motor 76.

On stopping of the projector apparatus by opening the stop/run switch 90, the relay 40 reverts to its unenergized condition. For this condition, the drive force to the film advancing sound sprocket 16 through clutch 26 is interrupted. At the same time, the brake solenoid 36 is energized and the flywheel clutch 46 is deenergized, causing the brake 34 to quickly decelerate the sound drum 12 to a stalled condition. Because of the braking action on the sound drum 12, it will be noted that the film portion 88 extending between the sound drum 12 and the advancing sprocket 16 remains in a desired taut condition without slack. Thus, the film 2 is immediately advanced at the sound drum 12 by the sound drum as well as by the sprocket 16 for instantaneous sound reproduction upon disposing the projector system in a run condition. It will be noted that this is true even for a condition where the sprocket 16 continues to advance some portion of the film over the sound drum upon stopping of the projector. In this case stoppage occurs between the surface of the sound drum 12 and brake pad 34 until sprocket 16 stops. Where, however, in addition it is desired to provide instantaneous sound from a particular portion of the film 2, the inclusion of the brake member 28 immediately stops advancement of the film by the sprocket 16. Thus, upon stopping of the projector, a desired segment of the film 2 may be maintained in a taut condition between the sound drum 12 and advance sprocket 16 ready for instant transducing of sound. This might be desirable, for instance, where the projector is to be utilized for transducing definitive segments of information in a broadcast studio environment.

Thus, it will be appreciated that the instant and simultaneous start to full speed of the sound drum and drive sprocket, with the film being disposed taut therebetween, provides the capability of instant quality sound transducing with the film. This is accomplished in a simple manner without undue complexity or interference with usual projector operation. In addition, it is accomplished in a manner which does not require subjecting the film to undue and unnecessary handling, frictional forces or stress which would damage the film.

What is claimed is:

1. The combination with a film projector apparatus for instant sound reproduciton from a film, including means to advance said film over a rotatable sound drum to provide rotation thereof, comprising: means for selectively disabling said film advancing means, means to arrest rotation of said sound drum to keep said film between said drum and said film advance means substantially taut, continuously rotatable drive means, and means operable when said film advancing means is enabled to couple said sound drum with said drive means.

2. The combination with a film projector apparatus for instant sound reproduction from a film which is advanced over a rotatable sound drum, comprising: first drive means for selectively enabling said film advance, second drive means, third means when enabled coupling said second drive means with said sound drum fourth means when enabled for arresting rotation of said sound drum, and fifth means for enabling said fourth means when said sound drum is decoupled from said second drive means.

3. The invention according to claim 2, wherein said second drive means includes a flywheel, a continuously rotating motor coupled with said flywheel, and said third means includes a clutch for selectively coupling said sound drum with said flywheel.

4. The invention according to claim 2, wherein said fourth means comprises a brake operable on said drum to maintain the film thereabout taut upon cessation of said film advance.

5. The combination with a film projector apparatus in which a film is to be advanced in contacting relation with a sound drum to provide rotation thereof at a given velocity, comprising: drive means continuously rotatable at a second velocity less than said given velocity; and means for coupling said drive means with said sound drum to cause said drum to approach said given velocity less than said second velocity.

6. The invention according to claim 5, including braking means for arresting the rotation of said drum prior to coupling thereof with said drive means.

7. The invention according to claim 5, wherein said drive means includes: a continuously rotatable motor, a flywheel, and further means for rotating said flywheel at said second velocity in response to rotation of said motor, and at said given velocity through said coupling means in response to rotation of said drum.

8. The invention according to claim 7, wherein said motor and said flywheel each include a drive hub secured thereto, and said further means includes a rotatable idler frictionally engaged with the drive hub of both said motor and said flywheel.

* * * * *

UNITED STATES PATENT OFFICE
CERTIFICATE OF CORRECTION

PATENT NO. : 3,905,691

DATED : September 16, 1975

INVENTOR(S) : Bjorn Fritjof Floden

It is certified that error appears in the above-identified patent and that said Letters Patent are hereby corrected as shown below:

In the Specification:

Column 3, Line 1 - "61" should be -- 62 -- .

Column 4, Line 36 - "operation" should be -- operating -- .

In the Claims:

Column 6, Line 42 - after "said given velocity" insert -- from a velocity -- .

Signed and Sealed this tenth Day of February 1976

[SEAL]

Attest:

RUTH C. MASON
*Attesting Officer*

C. MARSHALL DANN
*Commissioner of Patents and Trademarks*